United States Patent [19]
Geiger

[11] Patent Number: 5,820,083
[45] Date of Patent: Oct. 13, 1998

[54] HEAVY DUTY CABLE TIE MOUNT

[75] Inventor: Gerard G. Geiger, Jackson, Wis.

[73] Assignee: Tyton-Hellermann Corporation, Milwaukee, Wis.

[21] Appl. No.: 807,233

[22] Filed: Feb. 28, 1997

[51] Int. Cl.⁶ ................................................. F16L 3/08
[52] U.S. Cl. ........................................ 248/74.3; 248/68.1
[58] Field of Search .......................... 248/65, 68.1, 74.3, 248/74.1; 24/16 PD

[56] References Cited

U.S. PATENT DOCUMENTS

| | | | |
|---|---|---|---|
| 2,334,560 | 11/1943 | Kennedy | 248/68.1 X |
| 3,149,808 | 9/1964 | Weckesser | 248/74.3 |
| 3,460,788 | 8/1969 | Goldman | 248/74.3 |
| 4,032,096 | 6/1977 | Perrault et al. | 248/74.3 X |
| 4,910,831 | 3/1990 | Bingold | 24/16 PB |
| 5,301,907 | 4/1994 | Julian | 248/74.1 |
| 5,598,994 | 2/1997 | Olewinski et al. | 248/74.3 X |

OTHER PUBLICATIONS

Tyton Hellermann Corporation, "Cable Tie Accessories", undated Product Information Sheet.
Tyton Hellermann Corporation, "Accessories for Ducts", undated Product Information Sheet.
Hellermann Insuloid, "LKM Cradle", blueprint dated Mar. 9, 1983.
Tyton Company of Japan, Ltd., "Stud Bolt Mount", blueprint dated Mar. 19, 1996.
Various physical exhibits of prior art cable mount constructions predating Feb. 28, 1997.

Primary Examiner—Peter R. Brown
Attorney, Agent, or Firm—Ryan, Maki, Mann & Hohenfeldt

[57] ABSTRACT

A tie mounting system for securing elongate items to a supporting structure includes a flexible tie and a mount for anchoring the tie to the supporting structure adjacent a mounting stud. The mount is secured to the stud with a nut and washer and provides an anchoring loop through which the tie can be looped to secure the tie and the items to the mount. The mount extends up and away from the supporting structure to provide clearance for the tie. The trailing end of the mount is rounded and the upper surface of the mount is shaped to conform to the rounded shape of a second, similar mount. This enables two or more of the mounts to be stacked atop one another over the stud. A tab within the mount engages the stud to lightly secure the mount to the stud until the nut and washer can be installed. By using one or more ties having a buckle mount formed adjacent its locking head, two or more ties can be chained together to permit the mounting of two or more separate bundles with a single mount.

10 Claims, 3 Drawing Sheets

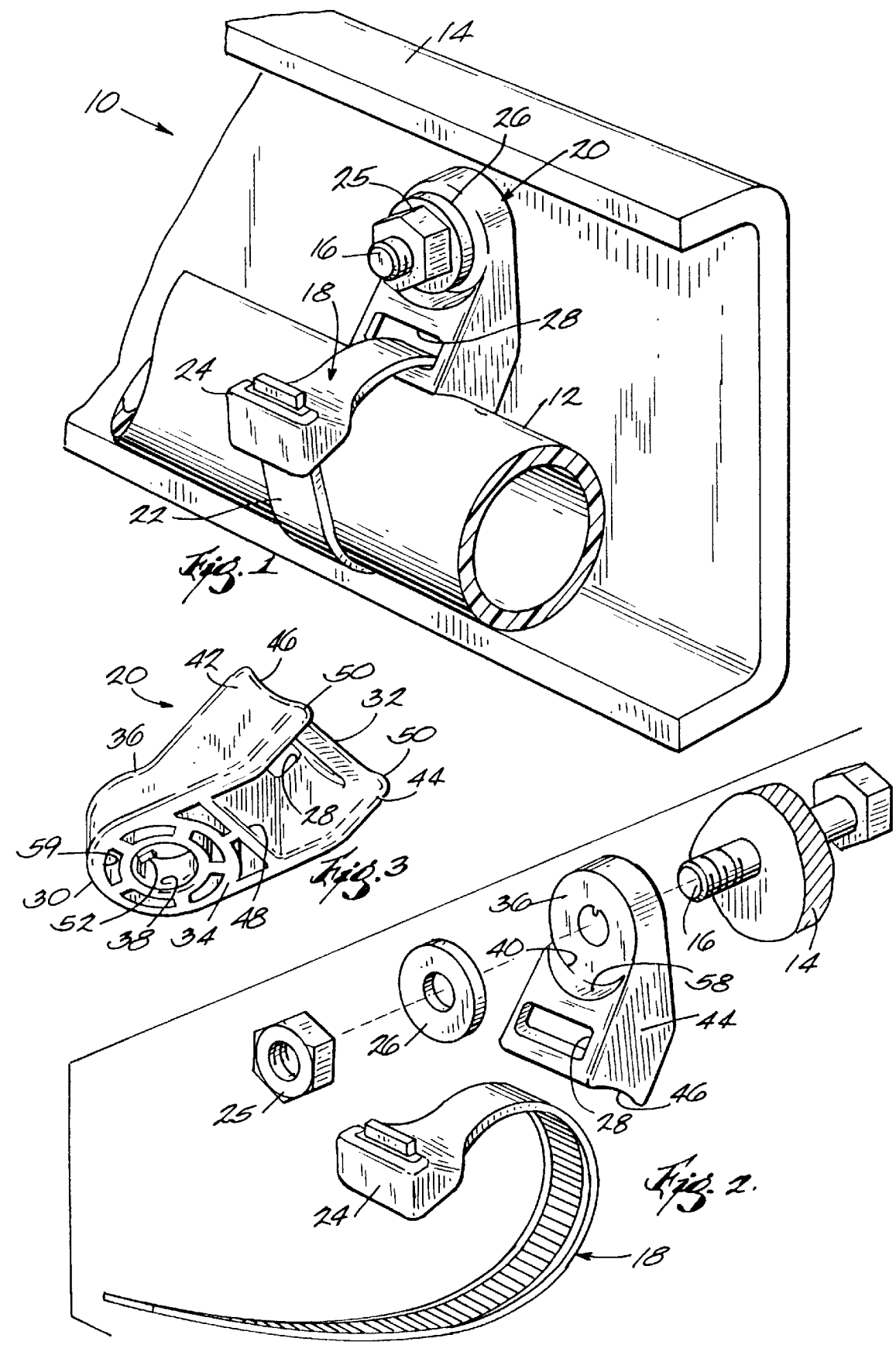

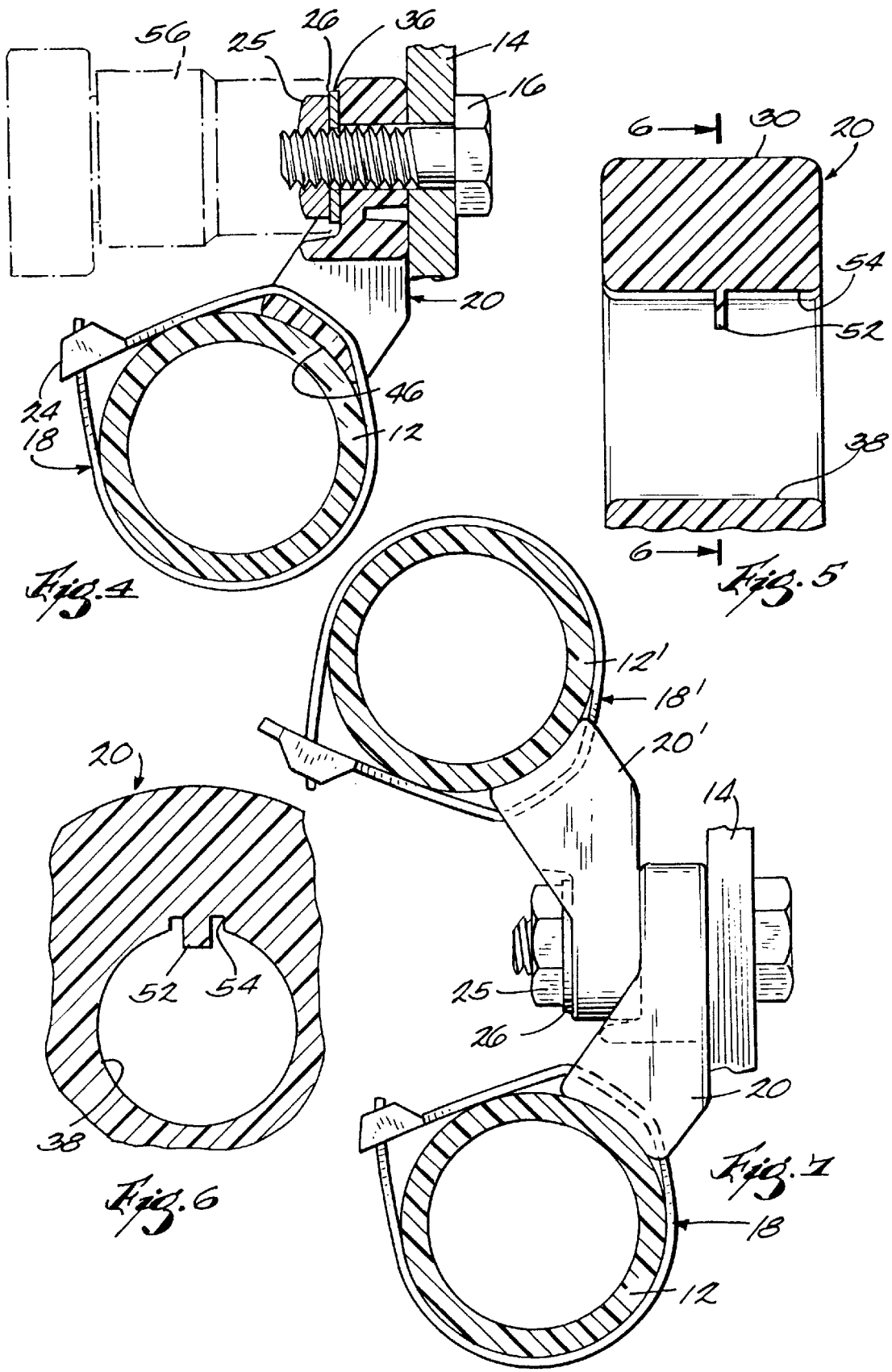

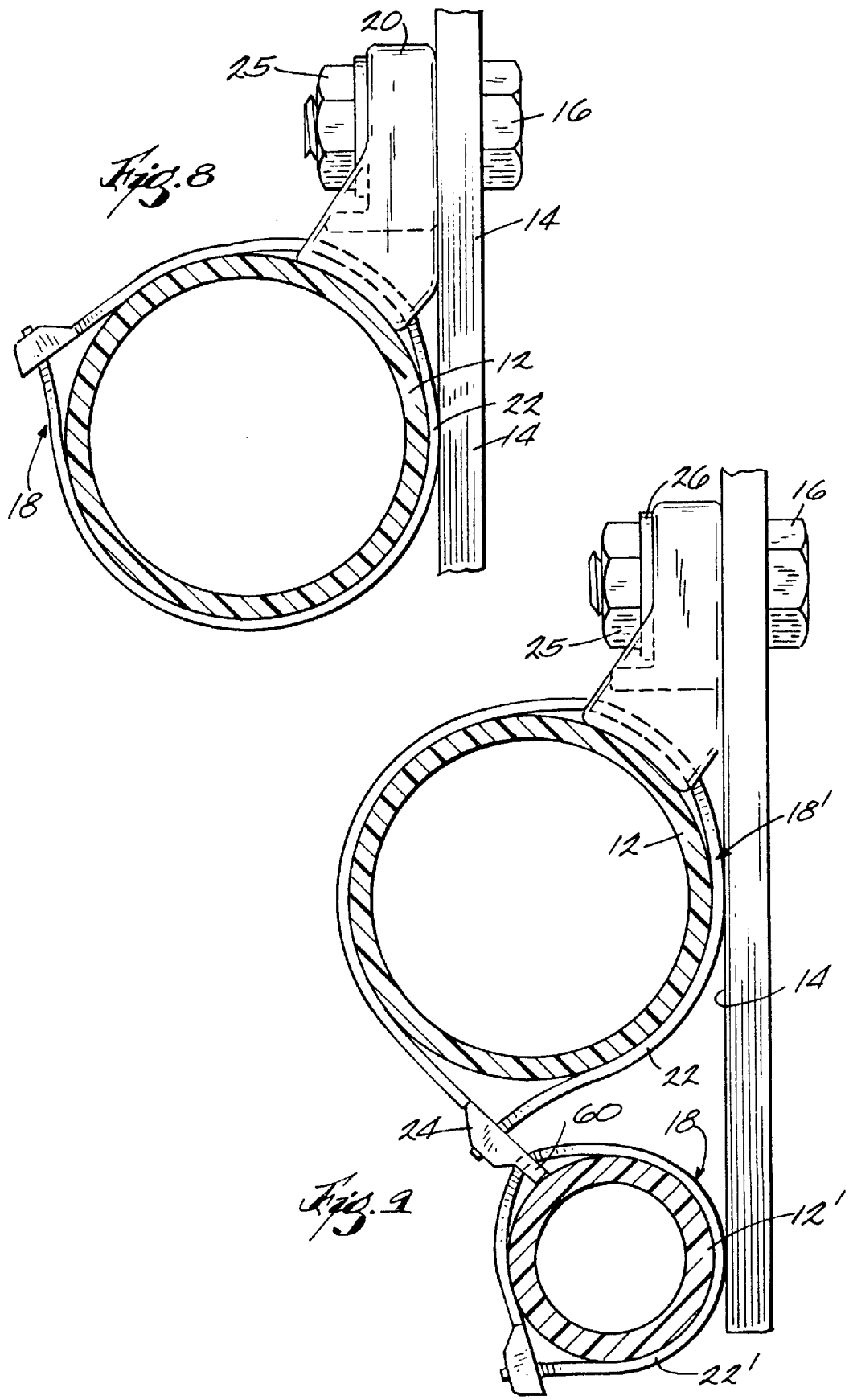

HEAVY DUTY CABLE TIE MOUNT

BACKGROUND OF THE INVENTION

This invention relates generally to hardware for securing elongate items, such as wires, cables, hoses, tubing, fiber optics, conduits, vines etc., into compact bundles. More particularly, the invention relates to mounts for securing flexible ties, such as cable ties, to a mounting element, such as a stud, bolt, screw, rivet, nail, etc., extending from a supporting structure or surface.

Flexible ties are widely used to secure elongate items, such as wires, cables, hoses and tubes, into compact, secure bundles. Typically, such ties include a head and a flexible strap which terminates in a tail. In use, the tie is looped around the wires, cables, hoses or tubes and the tail is inserted through the head. The tail is then pulled tight to pull the strap around the items and thereby secure the items into a compact, neat bundle. A pawl mechanism within the head secures the strap against withdrawal.

In many applications, it is sufficient merely to secure the items into a bundle. Such applications might include, for example, stationary electronic equipment that remains in one place and is subjected to little or no vibration in use. In other applications, it is necessary or desirable not only to secure the items into a bundle but to secure the resulting bundle to a supporting chassis or framework as well. Such applications are common, for example, in cars, trucks, airplanes, spacecraft, ships, boats and other vehicles where it is likely that moderate to severe jostling and vibration will at times be encountered. In still other applications (e.g. buildings), where vibration might not be an important consideration, it is still desirable to secure cables, hoses, tubes etc. to a fixed structure.

Flexible ties, in and of themselves, are not readily mounted to a supporting structure without the use of additional mounting structures or mounts. Various types of mounts have been proposed. Such mounts are used in conjunction with flexible cable ties and provide an anchor to which the cable tie can be secured in use. Generally, mounting structures can either be integrally formed with a cable tie to create a one piece unit or they can comprise an element wholly separate from the cable tie.

Integrally formed mounting structures result in a one-piece tie that simultaneously secures the wires or similar items into a bundle and secures the resulting bundle to a supporting structure. Although effective, the integral approach requires that a wide variety of sizes and configurations be kept on hand to meet the various mounting situations that can be encountered.

Separate mounts are independently secured to the supporting structure and provide an anchor through which a standard tie can be looped as it is looped around the items to be secured. This secures the items into a bundle and secures the resulting bundle to the supporting structure. One advantage of the separate approach is that a single mount design can be used with a multitude of different tie styles. Accordingly, a variety of mounting needs can be met with a single mount design. The need to stock a multitude of specialized ties is thus avoided.

SUMMARY OF THE INVENTION

The invention provides a mount for securing a flexible tie adjacent a mounting element extending from a supporting surface. The mount comprises a unitary member having an aperture dimensioned to receive the mounting stud therethrough, a trailing end having a semicircular outer periphery substantially centered around the aperture, a forward end extending upwardly and away from the trailing end and including an opening for receiving therethrough a flexible tie, a substantially flat and circular upper surface substantially centered on the aperture for receiving thereon a fastening element secured to the mounting element, and structure within the aperture for engaging the mounting element to loosely secure the mount to the element.

The invention also provides a mount for securing a flexible tie adjacent a mounting element extending from a supporting surface. The mount comprises a unitary member having a substantially circular aperture dimensioned to receive the mounting element therethrough, a trailing end having a semicircular outer periphery substantially centered around the aperture, and a pair of spaced sides extending upwardly and away from the trailing end. An arcuate front surface extends between the spaced sides and defines, in conjunction with the spaced sides, an opening for receiving a flexible tie therethrough. A substantially flat and circular upper surface is substantially centered on the aperture and is configured to receive thereon a fastening element secured to the mounting element. A tab within the aperture engages the mounting element to lightly secure the mount to the mounting element. The arcuate front surface conforms substantially to the curved shape of bundled items secured by a looped flexible tie. The spaced sides extend up and away from the supporting surface to provide adequate clearance for the tie to pass therebetween. The upper surface is shaped and dimensioned to provide clearance for a washer, a mounting nut, and a socket used to tighten the nut. The upper surface is also shaped to support the trailing end of a second mount so that two or more of the mounts can be placed on a single mounting element in stacked vertical arrangement.

The invention also provides a tie mounting system for securing elongate items to a supporting structure adjacent a mounting element. The system includes a flexible tie and a mount for anchoring the flexible tie to the supporting structure adjacent the mounting element. The mount comprises a unitary member having an aperture dimensioned to receive the mounting element therethrough, a trailing end having a semicircular outer periphery substantially centered around the aperture, a forward end extending upwardly and away from the trailing end and including an opening for receiving therethrough the flexible tie, a substantially flat and circular upper surface substantially centered on the aperture for receiving thereon a fastening element secured to the mounting element, and structure within the aperture for engaging the mounting element to lightly secure the mount to the mounting element.

In one embodiment, the forward end includes an arcuate front surface.

In one embodiment, the arcuate front surface conforms substantially to the curved shape of bundled wires, tubing or other items secured by the mount.

In one embodiment, the forward end includes a pair of spaced sides supporting the arcuate front surface therebetween.

In one embodiment, the opening is defined between the spaced sides and the front surface.

In one embodiment, the forward end extends up and away from the supporting surface.

In one embodiment, the upper surface is shaped to provide adequate clearance for a washer, a nut, and a socket used to tighten the nut.

In one embodiment, the upper surface is shaped and dimensioned to receive thereon the trailing end of a second mount so that two or more of the mounts can be placed on a single mounting element in stacked vertical arrangement.

In one embodiment, the mount is formed of injection molded plastic.

In one embodiment, the structure within the aperture comprises a tab extending into the interior of the aperture.

In one embodiment, the tab extends radially inwardly into the interior of the aperture.

In one embodiment, the tab is shaped and dimensioned to engage threads formed on the exterior of the mounting element.

It is an object of the invention to provide a new and improved mount for cable ties.

It is a further object of the invention to provide a cable tie mount that secures a cable tie firmly adjacent a mounting element extending from a supporting surface.

It is a further object of the invention to provide a cable tie mount that is usable with a variety of different cable tie styles, shapes and sizes.

It is a further object of the invention to provide a cable tie mount that permits two or more mounts to be stacked over each other around a single mounting element.

It is a further object of the invention to provide a cable tie mount that automatically secures itself lightly to a mounting element until such time as a more permanent and positive fastener can be secured to the element to secure the mount to the element.

It is a further object of the invention to provide a cable tie mount that is strong and durable in use and that is economical to manufacture.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 1 is a perspective view of a tie mounting system embodying various features of the invention.

FIG. 2 is an exploded perspective view of the system shown in FIG. 1.

FIG. 3 is a perspective view of a mount used in the mounting system and embodying various features of the invention.

FIG. 4 is a cross sectional view of the tie mounting system shown in FIG. 1.

FIG. 5 is a cross-sectional view of the mount shown in FIG. 3 showing details of the aperture and the retaining tab located therein.

FIG. 6 is a cross-sectional view of the mount shown in FIG 6 taken along line 6—6 thereof.

FIG. 7 is a side view of two tie mounting systems arranged in stacked relationship in accordance with one aspect of the invention.

FIG. 8 is a cross sectional view similar to FIG. 4 showing the mounting system securing a single bundle adjacent a mounting surface.

FIG. 9 is a cross sectional view similar to FIG. 8 showing multiple bundles secured to a supporting surface by means of the mounting system.

DESCRIPTION OF THE PREFERRED EMBODIMENT

A tie mount system 10 embodying various features of the invention is shown in FIG. 1. As illustrated, the system 10 is used to secure elongate elements or items, such as a cylindrical tube 12, to a supporting structure 14 having an outwardly projecting mounting element such as a stud 16. In the illustration of FIG. 1, the supporting structure 14 is the frame rail of a truck or similar vehicle, and the tube 12 is a pneumatic or hydraulic hose. It will be appreciated that these structures are shown for illustrative rather than limiting purposes, and it will be appreciated that the system 10 can be used in other applications and can be used to mount other items, such as wire bundles, hoses, tubes, fiber optics, conduits, vines, etc., to any form of supporting structure having a projecting mounting element, such as a stud, bolt, screw, threaded rod, rivet, nail, etc.

The tie mounting system 10 includes a flexible tie 18 and a mount 20. The flexible tie 18, which can comprise any one of a number of known, existing cable tie designs, includes a strap 22 that is insertable through a locking head 24 to form a loop around the elements to be secured 12. A pawl within the head 24 secures the strap 22 against withdrawal in known manner. The mount 20 encircles the mounting element, which in the illustrated embodiment comprises a threaded stud 16, and is secured to the supporting structure 14 by means of a fastener engaging the stud 16. In the illustrated embodiment, the fastener comprises a nut 25 threaded onto the stud 16. A washer 26 can be placed between the nut and the mount 20. The mount 20 thus provides an anchor to which the tie 18, and the items 12 secured within the tie, can be secured to the supporting structure 14.

Referring further to FIGS. 2–6, the mount 20 comprises a unitary structure that is adapted to encircle the stud 16 and bear against the supporting structure 14 when the mount 20 is secured in place by the nut 25. The mount 20 provides a rigid anchoring port or opening 28 through which the strap 22 can be looped and further functions to hold the items 12 adjacent the supporting structure 14.

As illustrated, the mount 20 includes a trailing end 30, a forward end 32, a bottom surface 34 and an upper surface 36. The bottom surface 34 is generally flat so as to lie flat against the supporting structure 14. An aperture 38 is formed through the trailing end 30 and is dimensioned to receive the mounting stud 16 therethrough. The trailing end 30 has a substantially semicircular outer periphery that is substantially centered around the aperture 38. The upper surface 36 includes a substantially flat and circular region 40 in an area centered around the aperture 38. The flat region 40 provides a surface against which the washer 26 and nut 25 can bear when the mount is secured to the supporting structure 14.

The forward end 32 is defined, in part, by a pair of spaced sides 42, 44 that extend upwardly and away from the trailing end 30. The sides 42, 44, in turn, support a front surface 46 that extends between the forwardmost ends of the sides 42, 44. The front surface 46 is preferably curved to conform to the shape of the bundled wires, tubing or other items 12 that are secured by the mounting system 10. Preferably, a rear wall or web 48 extends between sides 42, 44 immediately ahead of the trailing end 30. The anchoring port or opening 28 is defined between the spaced sides 42, 44, the rear wall 48 and the forward surface 46. The spacing of the sides 42, 44, the rear wall 48 and the front surface 46 is sufficient to enable the strap 22 of the tie 18 to extend therethrough. The lower corners 50 of the sides 42, 44 are chamfered as shown so as to provide clearance for the strap 22 as it passes through the opening 28 when the mount is in place over the supporting structure 14. As best seen in FIG. 4, the mount 20 functions to hold the secured items 12 adjacent the supporting structure 14 with sufficient clearance for the strap 22 to pass between the lower edge of the front surface 46 and the supporting structure 14.

In accordance with one aspect of the invention, structure is provided for lightly or loosely securing the mount 20 to the mounting stud 16 until the washer 26 and nut 25 can be installed and tightened. In the illustrated embodiment, such structure takes the form of a tab 52 formed in the sidewall of the aperture 38 and extending radially inwardly therein. The tab 52 projects sufficiently inwardly into the aperture 38 to engage the threads of the stud 16 and thereby keep the mount 20 from falling off the stud 16 under its own weight. This enables the installer to use both hands to install the washer 26 and nut 25 without having to keep the mount 20 in place on the stud by hand. Preferably, a vertical channel or slot 54 is formed in the side wall of the aperture 38, and the tab 52 comprises a thin, rectangular projection located along the slot 54. The tab 52 is preferably somewhat flexible and, thus, angularly displaceable relative to the remainder of the mount 20. This enables the mount 20 to be simply pressed onto the stud 16. The tab 52 simply deflects out of the way as the stud 16 passes through the aperture 38 and then snaps into engagement with the threads of the stud 16 when movement stops. The tab 52 thereafter keeps the mount 20 in position until the washer 26 and nut 25 are installed.

As best seen in FIGS. 2 and 4, the flat, circular region 40 is shaped and dimensioned to provide adequate clearance for the washer 26 and for a socket 56 used to tighten the nut 25. To this end, an arcuate cutout 58 is formed in the upper surface 36 of the mount 20.

In accordance with another aspect of the invention, the mount 20 is configured so that two or more of the mounts 20, 20' can be placed in alternating stacked vertical arrangement over a single stud 16 as best seen in FIG. 7. This enables two bundles of items 12, 12' to be run side-by-side, parallel to each other, by stacking two mounts 20, 20' on one stud. To this end, the flat and circular region 40 of the upper surface 36 is shaped and dimensioned to receive the trailing end 30 of a second mount 20'. In addition to providing clearance for the socket 56, the arcuate cutout 58 on the upper side of the mount 20 provides clearance for the rearward lower edge of the adjacent mount 20' stacked thereon. The nut 25 and washer 26 threaded onto the stud 16 secure the stacked mounts 20, 20' to the supporting structure 14.

Preferably, the mount 20 comprises a unitary structure that is formed by injection molding a suitable rigid, durable plastic. Such a suitable plastic is high impact Nylon 6/6. As best seen in FIG. 3, a plurality of interior voids 59 are molded into the underside 34 of the mount 20 to reduce maximum material thickness and thereby minimize or avoid dimensional changes and instabilities that might occur as the molded plastic cools during manufacture.

As best seen in FIG. 8, the mounting system 20 holds the bundled items 12 closely adjacent the supporting structure or surface 14. To this end, and in order to provide adequate clearance for the strap 22 between the mount and the surface 14, the sides 42 and 44 of the mount 20 extend up and away from the surface 14. This places the front surface 46 above the mounting surface 14 and provides adequate clearance for the strap 22.

In accordance with another aspect of the invention, a single mount 20 can be used to support two or more separate bundles of items. The need to support separate bundles can arise, for example, in refrigerated trucking applications where it is desired to keep electrical wires and the like physically away from lines carrying compressed refrigerant at elevated temperatures. Or, it might someday be decided to add additional lines to an existing installation.

Referring to FIG. 9, the capability of mounting multiple, separate bundles to a single mount 20 is provided through use of a tie having an buckle mount 60 formed at the head 24. In the illustrated embodiment, the buckle mount 60 is integrally formed with the tie 18' and projects outwardly from the locking head 24. The strap 22' of an additional tie 18 is looped through the buckle mount 60 and around the additional bundle 12' and pulled tight. Preferably, the locking head 24 of the first tie 18' is positioned as shown so that both bundles 12 and 12', lie against the supporting surface 14. Although two bundles 12, 12' are shown supported by a single mount 20, it will be appreciated that, by using multiple ties having additional buckle mounts 60, a multitude of separate bundles can be "chained" together and supported by a single mount 20.

While a particular embodiment of the invention has been shown and described, it will be obvious to those skilled in the art that changes and modifications can be made without departing from the invention in its broader aspects, and, therefore, the aim in the appended claims is to cover all such changes and modifications as fall within the true spirit and scope of the invention.

I claim:

1. In a mount of the type comprising a unitary structure having a base portion and a support portion extending outwardly and away from the base portion, the base portion further including a flat lower surface, a flat upper surface substantially parallel to the lower surface, an arcuate forward end opposite the support portion and an aperture extending through the base portion between the upper and lower surfaces, the improvement comprising:

an arcuate wall formed on the support portion extending away from the upper surface of the base portion and defining, in conjunction with the upper surface, a recess substantially conforming in shape and dimension to the arcuate forward end of the base portion whereby one of the mounts can be stacked onto another of the mounts with the forward end of the base portion of one mount received in the recess of the other mount and with the apertures of the mounts substantially axially aligned.

2. The improvement as defined in claim 1 wherein the upper surface is substantially circular in shape and is substantially centered on the aperture, a portion of the circular shape being defined by the arcuate forward end of the base portion and another portion of the circular shape being defined by the arcuate wall.

3. In a mount of the type comprising a unitary structure having a base portion and a support portion extending outwardly and away from the base portion, the base portion further including a flat lower surface, a flat upper surface substantially parallel to the lower surface, an arcuate forward end opposite the support portion and an aperture extending through the base portion between the upper and lower surfaces, the improvement comprising:

an arcuate wall formed on the support portion extending away from the upper surface of the base portion and defining, in conjunction with the upper surface, a recess substantially conforming in shape and dimension to the arcuate forward end of the base portion whereby one of the mounts can be stacked onto another of the mounts with the forward end of the base portion of one mount received in the recess of the other mount and with the apertures of the mounts substantially axially aligned, and structure within the aperture adapted to engage the threads of a mounting stud when a mounting stud is inserted through the aperture, the structure thereby serving to loosely secure the mount to the mounting stud.

4. The improvement as defined in claim 3 wherein the structure comprises a flexible tab.

5. The improvement as defined in claim 4 wherein the flexible tab is integrally formed with the base portion of the mount.

6. The improvement as defined in claim 5 wherein the aperture is substantially circular and the flexible tab projects substantially radially inwardly into the aperture.

7. The improvement as defined in claim 6 wherein the tab is of substantially rectangular shape.

8. The improvement as defined in claim 7 wherein the aperture includes a sidewall having a longitudinal groove formed therein and the tab is disposed within the groove.

9. The improvement as defined in claim 8 wherein the mount includes only a single tab for engaging the mounting element.

10. The improvement as defined in claim 7 wherein the upper surface is substantially circular in shape and is substantially centered on the aperture, a portion of the circular shape being defined by the arcuate forward end of the base portion and another portion of the circular shape being defined by the arcuate wall.

\* \* \* \* \*